US008174821B2

(12) United States Patent
Fontana et al.

(10) Patent No.: US 8,174,821 B2
(45) Date of Patent: May 8, 2012

(54) CABINET FOR A HIGH CURRENT POWER DISTRIBUTION SYSTEM

(75) Inventors: Edward C. Fontana, Rockwell, TX (US); Paul Smith, Plano, TX (US); Roy J. Davis, Rowlett, TX (US)

(73) Assignee: Lineage Power Corporation, Plano, TX (US)

( * ) Notice: Subject to any disclaimer, the term of this patent is extended or adjusted under 35 U.S.C. 154(b) by 151 days.

(21) Appl. No.: 12/775,915

(22) Filed: May 7, 2010

(65) Prior Publication Data
US 2011/0141665 A1 Jun. 16, 2011

Related U.S. Application Data

(60) Provisional application No. 61/308,215, filed on Feb. 25, 2010, provisional application No. 61/287,322, filed on Dec. 17, 2009, provisional application No. 61/287,057, filed on Dec. 16, 2009.

(51) Int. Cl.
*H02B 1/04* (2006.01)
(52) U.S. Cl. ........ 361/601; 361/622; 361/624; 361/636; 174/71 B; 174/72 B
(58) Field of Classification Search ............. 361/679.01, 361/600, 601, 602, 605, 608, 611, 614, 622–624, 361/641–648, 673, 809, 825, 627–637; 307/33, 38, 39, 52, 129, 150; 174/50, 59, 68.2; 364/528.28, 528.29, 528.21, 709.1, 140.05; 312/223.2, 223.3, 236
See application file for complete search history.

(56) References Cited

U.S. PATENT DOCUMENTS

| 3,949,277 | A | * | 4/1976 | Yosset | 361/679.4 |
| 5,390,081 | A | * | 2/1995 | St. Pierre | 361/775 |
| 5,969,965 | A | * | 10/1999 | Byrne et al. | 363/144 |
| 6,160,699 | A | * | 12/2000 | Gibson et al. | 361/643 |
| 6,351,715 | B1 | * | 2/2002 | Ykema | 702/62 |
| 7,076,592 | B1 | * | 7/2006 | Ykema | 710/305 |
| 7,142,411 | B2 | * | 11/2006 | McLeod | 361/624 |
| 7,791,863 | B2 | * | 9/2010 | Strackbein et al. | 361/622 |
| 7,826,201 | B2 | * | 11/2010 | Schell et al. | 361/611 |

FOREIGN PATENT DOCUMENTS

JP 02000184521 A * 6/2000

* cited by examiner

*Primary Examiner* — Michail V Datskovskiy (57) ABSTRACT

A power distribution system comprising a cabinet having one or more equipment envelops for holding electrical component modules therein and an interior passageway that is configured to accommodate DC vertical bus bars within the cabinet. The interior passageway is also configured such that the vertical bus bars can be positioned outside of lateral perimeters of the equipment envelops and the vertical bus bars can substantially traverse an entire interior long axis length of the cabinet.

17 Claims, 5 Drawing Sheets

CABINET FOR A HIGH CURRENT POWER DISTRIBUTION SYSTEM

CROSS-REFERENCE TO RELATED APPLICATIONS

This application claims the benefit of U.S. Provisional Application Ser. No. 61/308,215, filed on Feb. 25, 2010, to Edward C. Fontana, et al. entitled, "POWER DISTRIBUTION PLATFORM;" Provisional Application Ser. No. 61/287,322, filed on Dec. 17, 2009, to Roy Davis, et al. entitled, "HYBRID ARCHITECTURE FOR DC POWER PLANTS;" and Provisional Application Ser. No. 61/287,057, to filed on Dec. 16, 2009 to Edward C. Fontana, et al. entitled, "A FLOOR MOUNTED DC POWER DISTRIBUTION SYSTEM," which are all commonly assigned with this application and incorporated herein by reference in their entirety.

TECHNICAL FIELD

This application is directed, in general, to a power distribution system and, more specifically, to an electronic cabinet of the system and method of installing the power distribution system having such a cabinet.

BACKGROUND

This section introduces aspects that may be helpful to facilitating a better understanding of the inventions. Accordingly, the statements of this section are to be read in this light. The statements of this section are not to be understood as admissions about what is in the prior art or what is not in the prior art.

Telecommunication sites are evolving into large data centers, making extensive use of many similar configurations of server equipment. The Green Grid consortium has suggested that 48 VDC is the most efficient and cost effective way to power such equipment, and, provide the highest availability and reliability of reserve power in case of utility grid failure. Present direct current (DC) distribution and installation practices, however, can be time consuming, have high labor costs, and require large amounts of copper cabling with its associated overhead support structures, thereby further increasing the costs of such installations.

There is a long-felt need to more efficiently install and distribute DC power to server equipment at reduced labor and material costs.

SUMMARY

One embodiment provides a power distribution system. The system comprises a cabinet having one or more equipment envelops for holding electrical component modules therein and an interior passageway that is configured to accommodate DC vertical bus bars within the cabinet. The interior passageway is also configured such that the vertical bus bars can be positioned outside of lateral perimeters of the equipment envelops and the vertical bus bars can substantially traverse an entire interior long axis length of the cabinet.

Another embodiment provides a method of assembling the above-described power distribution system. The method comprises positioning DC vertical bus bars within the interior passageway of the cabinet such that the vertical bus bars can substantially traverse the entire interior long axis length of the cabinet.

BRIEF DESCRIPTION OF DRAWINGS

Embodiments of the disclosure are better understood from the following detailed description, when read with the accompanying figures. Corresponding or like numbers or characters indicate corresponding or like structures. Various features may not be drawn to scale and may be arbitrarily increased or reduced in size for clarity of discussion. Reference is now made to the following descriptions taken in conjunction with the accompanying drawings, in which.

DETAILED DESCRIPTION

The following merely illustrate principles of the invention. Those skilled in the art will appreciate the ability to devise various arrangements which, although not explicitly described or shown herein, embody the principles of the invention and are included within its scope. Furthermore, all examples and conditional language recited herein are principally intended expressly to be only for pedagogical purposes to aid in understanding the principles of the invention and the concepts contributed by the inventor(s) to furthering the art, and are to be construed as being without limitation to specifically disclosed embodiments and conditions. Moreover, all statements herein reciting principles, aspects, and embodiments of the invention, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Figure 1:
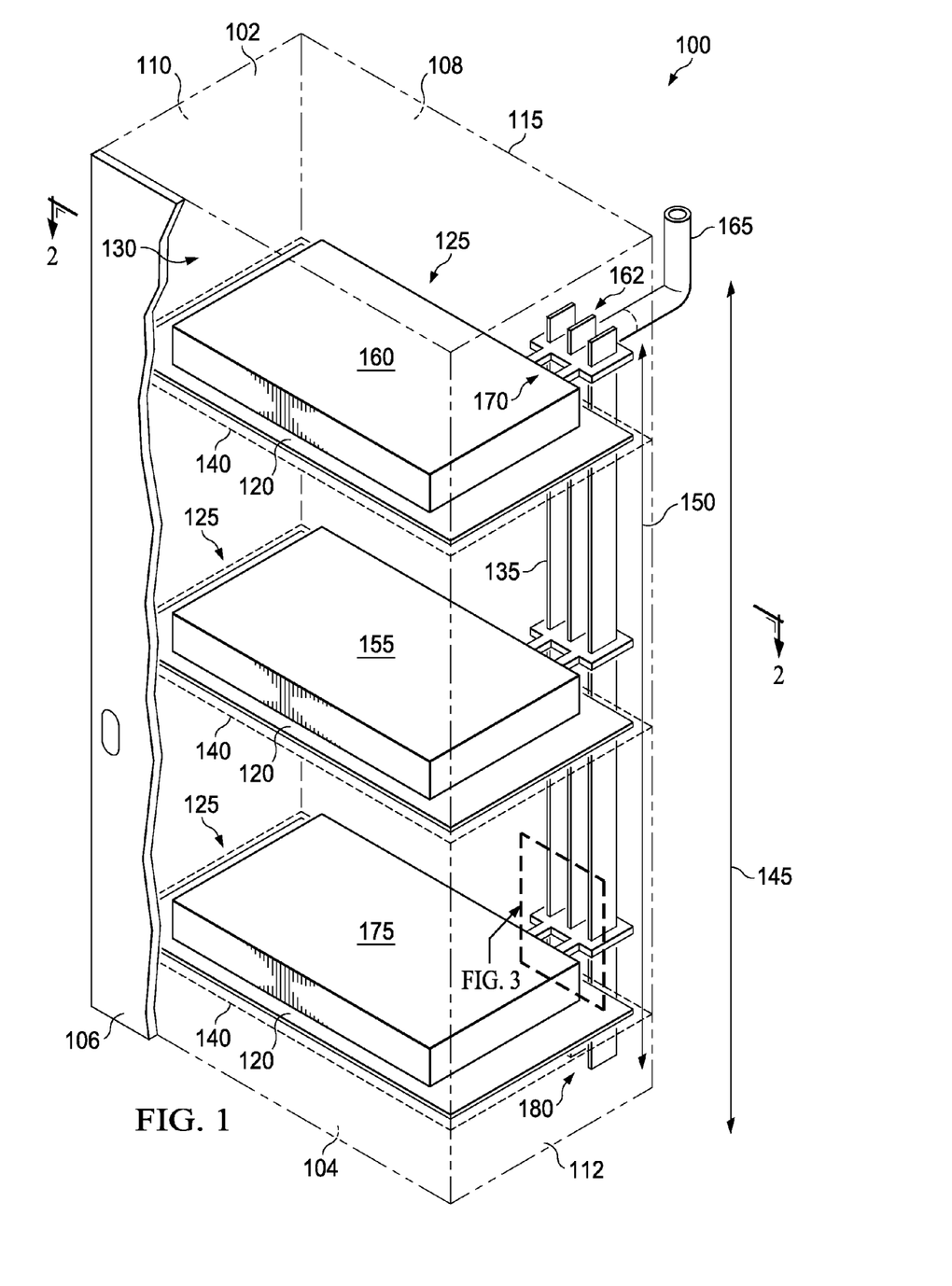
FIG. 1 shows a perspective view of an example embodiment of a power distribution system having the cabinet of the disclosure.
Figure 2:
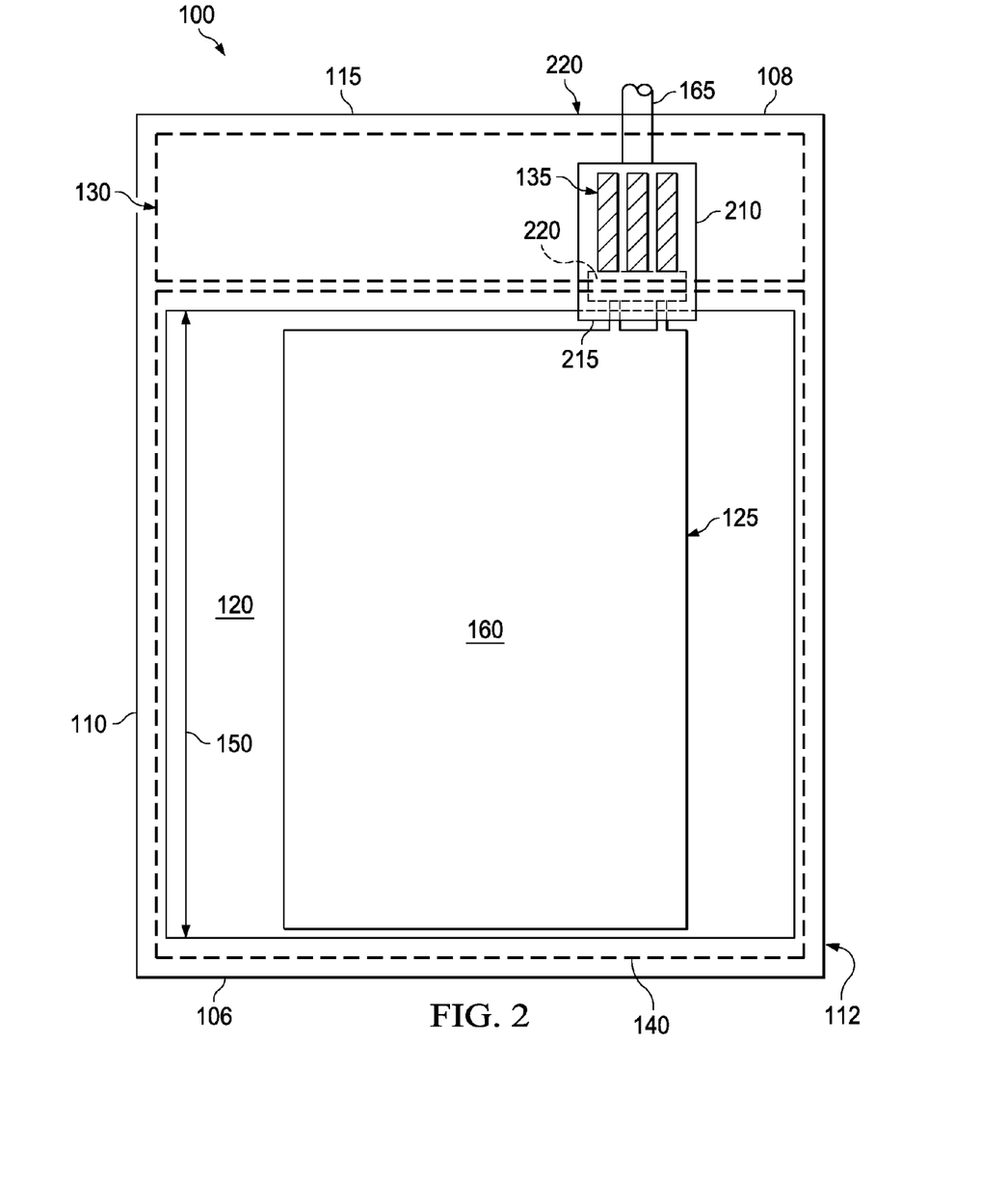
FIG. 2 shows a plan view of the example power distribution system of FIG. 1 through view line 2-2 in FIG. 1.
Figure 3:
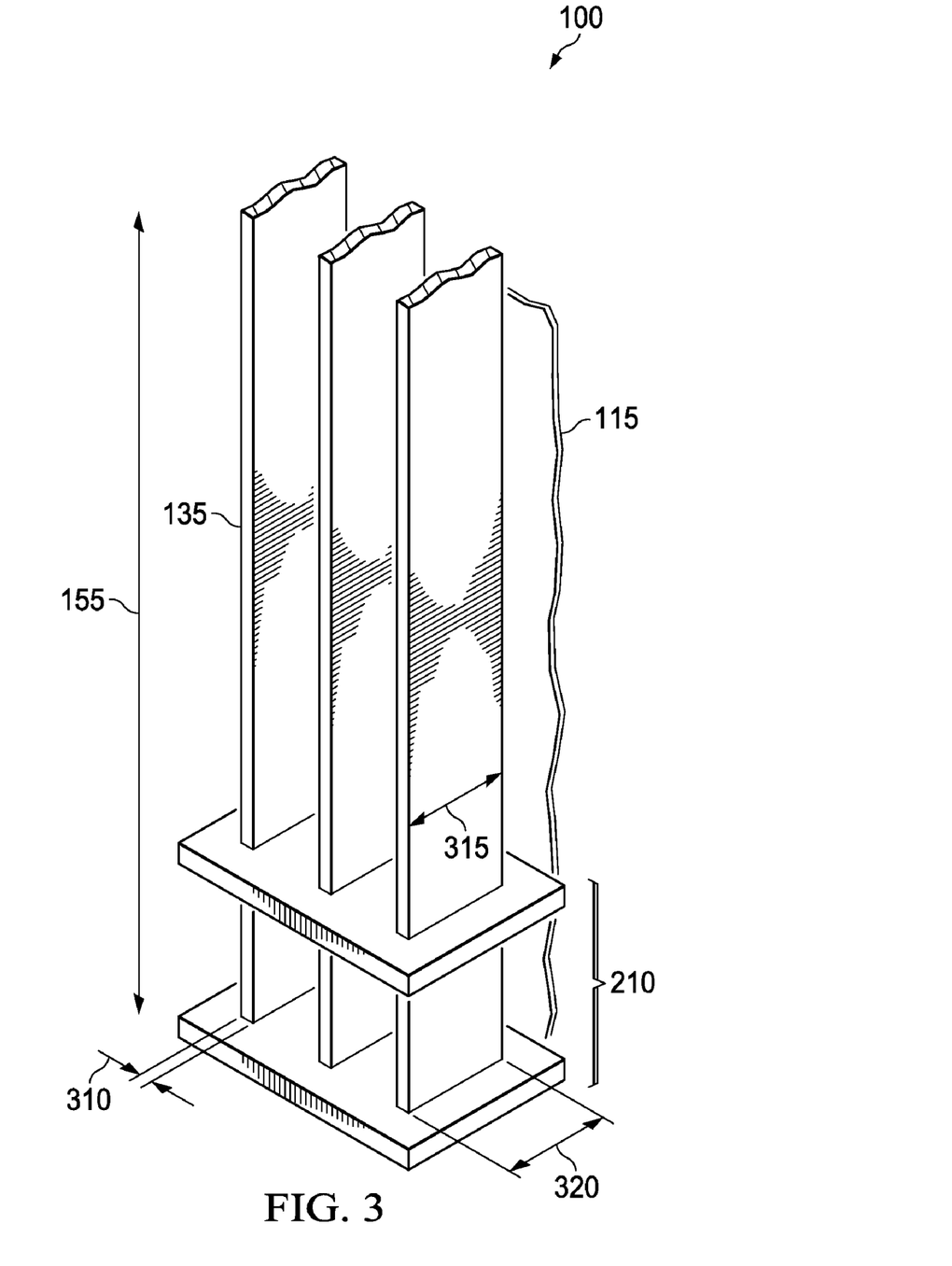
FIG. 3 presents a detailed perspective view of an example embodiment of the cabinet corresponding to view 3 for the power distribution system displayed in FIG. 1.

One embodiment is a power distribution system. FIG. 1 shows a perspective view of an example embodiment of the power distribution system 100 featuring a cabinet of the disclosure. FIG. 2 shows a cross-sectional plan view of the system 100 through view line 2-2 in FIG. 1. FIG. 3 shows a detailed perspective view of the power distribution system 100 corresponding to view 3 in FIG. 1.

As used herein, the terms top side 102, bottom side 104, front side 106, rear side 108 and lateral sides 110, 112 are from the perspective of the front view presented in FIG. 1.

The example power distribution system 100 comprises a cabinet 115 having one or more equipment envelops 120 for holding electrical component modules 125 (e.g., telecommunication server equipment, rectifiers, batteries or similar equipment). The cabinet 115 also has an interior passageway 130 that is configured to accommodate DC vertical bus bars 135 within the cabinet. The interior passageway 130 is configured such that the vertical bus bars 135 can be positioned outside of lateral perimeters 140 of the equipment envelops 120 and such that the vertical bus bars 135 can substantially traverse an entire interior long axis length 145 of the cabinet 115.

For instance, in some embodiments, a long axis length 150 of the vertical bus bars 135 is at least about 80 percent of the cabinet's 115 long axis length 145.

One of ordinary skill in the art would understand that the term equipment envelop 120 refers to the location within the cabinet 115 that is designed to hold the electrical component modules 125, and how the equipment envelop 120 could be defined by housing structures 155 that e.g., the electrical component modules 125 can rest on, slide into, or otherwise be held in place by. Example housing structures 155 include support beams, shelves, slots or similar structures that the modules 125 could removably or fixedly be held by.

In some embodiments of the system 100, the cabinet 115 further includes DC vertical bus bars 135. To provide sufficient power to the equipment modules 125, e.g., used for some telecommunications systems 100, the vertical bus bars 135 are preferably configured to carry a high direct current loads of about 80 Amps or greater, over the entire long axis length 150 of the bus bar 135. In some cases, to facilitate carrying high direct current loads, the vertical bus bar 135 can made of aluminum, copper or similar metals or metal alloys. In some cases it is preferable to use aluminum bar bars 135 in order to reduce the weight and cost of the cabinet 115, as compared to, e.g., copper bus bars 135. In some cases, to facilitate carrying high direct current loads, the vertical bus bar 135 (e.g., aluminum bus bars) have a thickness 310 of about 0.25 inches or greater and short axis 315 width 320 of about 2 inches cm or greater (FIG. 3).

The interior passageway 130 includes a portion of an interior space of the cabinet 115 that falls outside of the lateral perimeters 140 of the equipment envelops 120. For instance, in some embodiments, such as shown in FIGS. 1-2, the interior passageway 130 is located behind the lateral perimeters 140 of the equipment envelops 120. That is, the interior passageway 130 can be located adjacent to the rear side 108 of the cabinet 115. For some embodiments, having the lateral perimeters 140 located towards the rear side 108 can facilitate providing access to the vertical bus bar 135 for inspection or maintenance.

Figure 4:
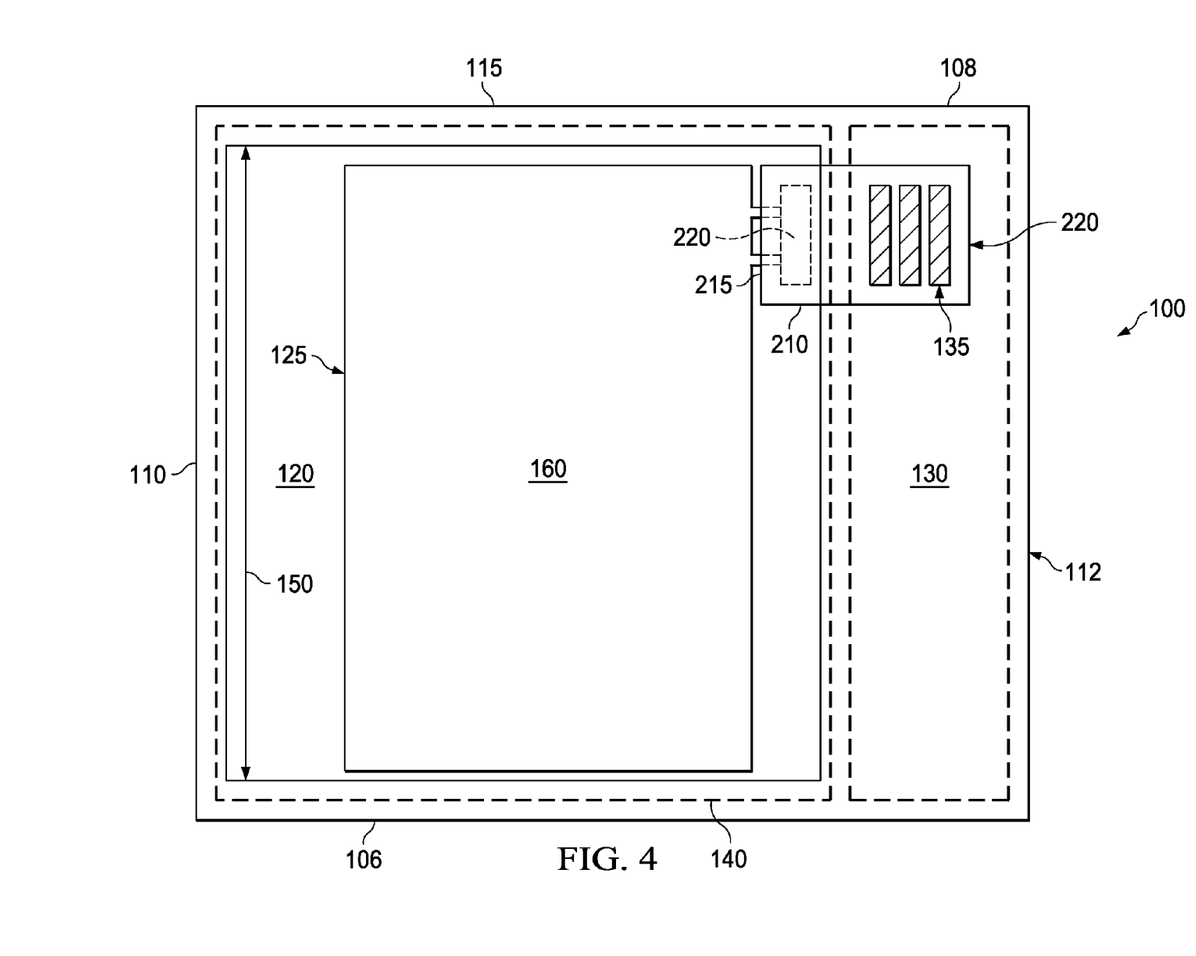
FIG. 4 shows another plan view of the power distribution system analogous to the view line 2-2 in FIG. 1.

FIG. 4 shows a plan view of an alternative embodiment, analogous to the view shown in FIG. 2, where the interior passageway 130 is located laterally adjacent to the lateral perimeters 140. That is, the interior passageway 130 can be located adjacent to one of the lateral sides 110, 112 of the cabinet 115 (e.g., side 112 in FIG. 4). For some embodiments, having the lateral perimeters 140 located towards one of the lateral sides 110, 112 can also providing access to the bus bars 135 through the front 106 or lateral sides 110, 112 of the cabinet 115. This could be the case for embodiments where, e.g., the rear side 108 of the cabinet 115 is located adjacent to a room wall or other structure that could limit rear-access to the bus bars 135.

As further illustrated in FIGS. 2 and 4, in some embodiments of the system 100 further include at least one adapter 210 configured to connect to one of the vertical bus bars 135 and to one of the electrical component modules 125 when the electrical component module 125 is located in the equipment envelop 120. In some cases, the adapter 210 can be built into the electrical component module 125, or it could be a separately built add-on. As illustrated, in some cases one end 215 of the adaptor 210 is in equipment envelop 120 and another end 220 of the adapter 210 is in the interior passageway 130.

In some cases, as shown in FIG. 3, locating the adaptor 210 to the rear of the electrical component module 125 (e.g., towards the rear 108 of the cabinet 115) can facilitate seating of the electrical component module 125 into the adaptor 210, or connect the adaptor 210 to the vertical bus bars 135. In other cases, however, as shown in FIG. 4, the adapter 210 can be located to one of the sides 110, 112 of the electrical component module 125.

In some embodiments, the adaptor 210 preferably includes one or more over-current protection devices 220 (e.g., a fuse or circuit breaker device), to provide protection to the electrical component module 125 plugged into the adaptor 210. The adaptor 210 can facilitate high current density loads (e.g., about 80 Amps or higher), such as the electrical component modules 125, to be plugged into or unplugged from the over-current protection devices 220, as needed, without compromising the standard size of existing modules 125.

As further illustrated in FIGS. 1 and 2, in some embodiments, one of the electrical component modules 125 includes, or is, a rectifier 160 connected to one end 162 of the DC vertical bus bars 135. In some cases, the cabinet 115 further includes an AC conduit 165 that is connected to the rectifier 160 via the bus bar 135. The AC conduit 166 can be configured to hold an AC power feed 170 coupled to a power source (not shown). In some embodiments, to situate the rectifier closer to the end 162 of the bus bar 135 that it is connected to and provide safety spacing between the AC conduit 166 and bus bars 135, it is desirable for the rectifier 160 to be located in an upper-most one of the equipment envelops 120 of the cabinet 115. However, in other embodiments the rectifier 160 can be located in a lower-most one of the equipment envelops 120.

As further illustrated in FIG. 1, in some embodiments, one of electrical component modules 125 includes, or is, a battery 175 connected to one end of the DC vertical bus bars 135. As further discussed in the Provisional Application Ser. No. 61/287,322, locating the battery 175 in the cabinet 115 can facilitate the inexpensive delivery of backup DC power to the electrical component modules 125 with a minimum of current losses via the bus bars 135. In some embodiments, to help reduce the chances of the cabinet 115 being tipped over it is desirable to locate a heavy battery 175 in a lower-most one of the equipment envelops 120 of the cabinet 115.

In some embodiments, as illustrated in FIG. 1, the cabinet 115 can include both the rectifier 160 and the battery 175. For instance, one of the electrical component modules 125 can include a rectifier 160 connected to one end 162 (e.g., a top end) of the DC vertical bus bars 135 and another one of electrical component modules 125 can include a battery 175 connected to the other end 180 (e.g., a bottom end) of the DC vertical bus bars 135. The cabinet's passageway 130 and the DC vertical bus bars 135 therein, facilitate a dual DC feed. For example, a rectifier 160, in an upper-most envelop 120, can feed a DC load to the modules 125 from the top via the bus bars 135, and a battery 175, in the lower-most envelop 120, can feed a DC load from the bottom via the bus bars 135.

The cabinet 115 can be adapted to be used with other components of the system 100 including power distribution platforms, stacked bus bars, and other cabinet components, such as discussed in the above-identified provisional patent applications, as well as the following non-provisional patent applications: U.S. patent application Ser. No. 12/775,796 to Edward Fontana, Paul Smith and William England entitled, "A platform for a power distribution system"; U.S. patent application Ser. No. 12/775,846 to Edward Fontana, Paul Smith, William England and Richard Hock, entitled, "Stack of bus bars for a power distribution system"; U.S. patent application Ser. No. 12/775,882 to Edward Fontana, Paul Smith and William England, entitled, "A cabinet for a power distribution system"; U.S. patent application Ser. No. 12/775,954 to Edward Fontana and Paul Smith entitled, "Thermal extensions for monitoring temperature changes in DC bus bar terminations," all of which are incorporated herein in their entirety.

Another embodiment of the disclosure is a method of assembling the power distribution system. For example, the assembly can be performed at an installation site of the system 100. The method can be used to assemble any of the power distribution systems 100 discussed in the context of FIGS. 1-6 herein.

Figure 5:
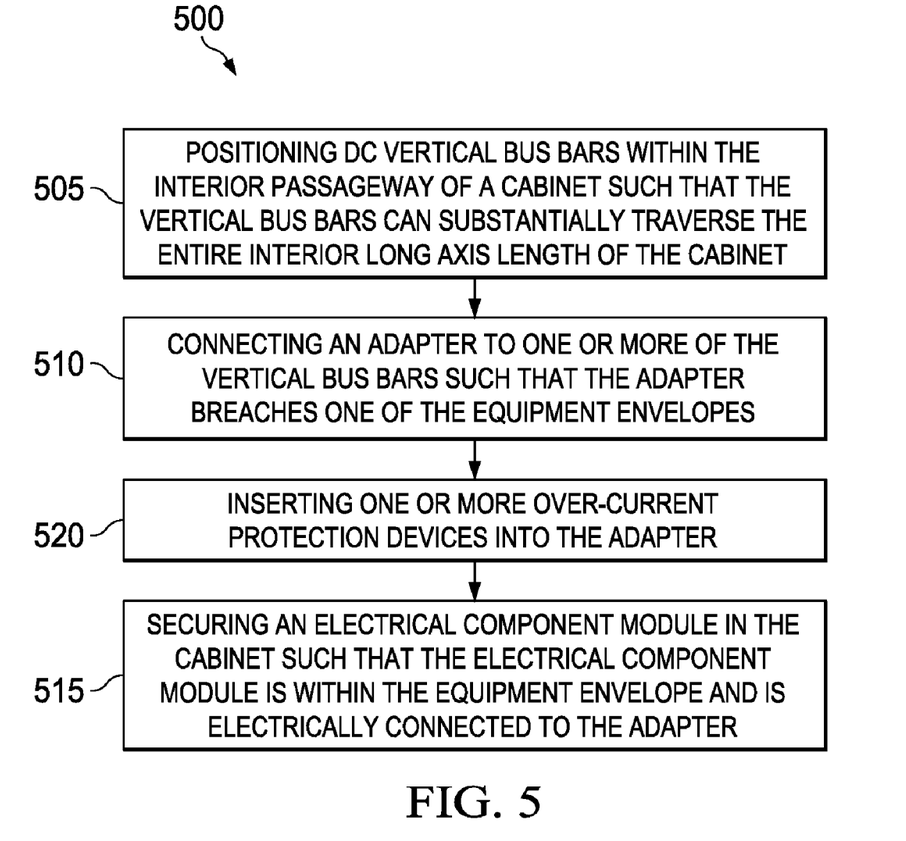
FIG. 5 presents a flow diagram of an example embodiment of a method of assembling a power distribution system of the disclosure, such as any of the example systems depicted in FIGS. 1-4.

FIG. 5 presents a flow diagram of an example embodiment of selected steps in the method 500 of assembling the power distribution system. With continuing reference to FIGS. 1-4, the method 500 comprises a step 505 of positioning DC vertical bus bars 135 within the interior passageway 130 of the cabinet 115 such that the vertical bus bars 135 (e.g., the long axis length 150) can substantially traverse the entire interior long axis length 145 of the cabinet 115.

Some embodiments of the method 500 can further include a step 510 of connecting an adapter 210 to one or more of the vertical bus bars 135 such that the adapter 210 breaches one of the equipment envelopes 120.

Some embodiments of the method 500 can further include a step 515 of securing an electrical component module 125 in the cabinet 115 such that the electrical component module 125 is within the equipment envelope 120 and is electrically connected to the adapter 210.

Some embodiments of the method 500 can further include a step 520 of including inserting one or more over-current protection devices 220 into the adapter 210. In some embodiments it is preferable for the one or more over-current protection devices 220 to be inserted into the adapter 210 in step 520 before the step 515 of securing the electrical component module 125 in the cabinet 115.

One skilled in the art would understand that additional steps could be performed to complete the system's 100 installation. Examples of such additional steps are provided in the provisional and non-provisional patent applications cited elsewhere herein and incorporated by reference in their entirety.

Although the embodiments have been described in detail, those of ordinary skill in the art should understand that they could make various changes, substitutions and alterations herein without departing from the scope of the disclosure.

What is claimed is:

1. A power distribution system, comprising:
a cabinet having one or more equipment envelops for holding electrical component modules therein and an interior passageway that is configured to accommodate DC vertical bus bars within the cabinet such that the vertical bus bars can be positioned outside of lateral perimeters of the equipment envelops and the vertical bus bars can substantially traverse an entire interior long axis length of the cabinet; and
the vertical bus bars positioned within the interior passageway, wherein each of the DC vertical bus bars are configured to carry a direct current of about 80 Amps or greater with an applied voltage of about 48 DC Volts, are composed of aluminum, have a thickness of at least about 0.25 inches, a short axis width of at least about 2 inches, and a long axis length equal to at least about 80 percent of a long axis length of the cabinet.

2. The power distribution system of claim 1, wherein each of the DC vertical bus bars are configured to carry the direct current of about 80 Amps or greater over the entire long axis length of the bus bar.

3. The power distribution system of claim 1, wherein the interior passageway is located behind the lateral perimeters of the equipment envelops.

4. The power distribution system of claim 1, wherein one of electrical component modules includes a rectifier connected to one end of the DC vertical bus bars.

5. The power distribution system of claim 4, wherein the cabinet further includes an AC conduit that is connected to the rectifier.

6. The power distribution system of claim 5, wherein the rectifier is located in an upper-most one of the equipment envelops of the cabinet.

7. The power distribution system of claim 1, wherein one of electrical component modules includes a battery connected to one end of the DC vertical bus bars.

8. The power distribution system of claim 1, wherein one of the electrical component modules includes a rectifier connected to one end of the DC vertical bus bars and another one of electrical component modules includes a battery connected to the other end of the DC vertical bus bars.

9. A power distribution system, comprising:
a cabinet having one or more equipment envelops for holding electrical component modules therein and an interior passageway that is configured to accommodate DC vertical bus bars within the cabinet such that the vertical bus bars can be positioned outside of lateral perimeters of the equipment envelops and the vertical bus bars can substantially traverse an entire interior long axis length of the cabinet, wherein the interior passageway is located laterally adjacent to the lateral perimeters of the equipment envelops.

10. A power distribution system, comprising:
a cabinet having one or more equipment envelops for holding electrical component modules therein and an interior passageway that is configured to accommodate DC vertical bus bars within the cabinet such that the vertical bus bars can be positioned outside of lateral perimeters of the equipment envelops and the vertical bus bars can substantially traverse an entire interior long axis length of the cabinet further including at least one adapter configured to connect to one of the vertical bus bars and to one of the electrical component modules when the electrical component module is located in the equipment envelop, wherein the adaptor includes one or more over-current protection devices.

11. The power distribution system of claim 10, wherein the over current protection devices includes one or more fuses.

12. The power distribution system of claim 10, wherein the over current protection devices includes one or more circuit breakers.

13. The power distribution system of claim 10, wherein one end of the adaptor is in equipment envelop and another end of the adapter is in the interior passageway.

14. The power distribution system of claim 10, wherein the adaptor is located behind the electrical component module.

15. The power distribution system of claim 10, wherein the adaptor is located to one of the sides of the electrical component module.

16. A method of assembling the power distribution system, comprising:
providing a cabinet having one or more equipment envelops for holding electrical component modules therein and an interior passageway that is configured to accommodate DC vertical bus bars within the cabinet such that the vertical bus bars can be positioned outside of lateral perimeters of the equipment envelops and the vertical bus bars can substantially traverse an entire interior long axis length of the cabinet;

positioning the DC vertical bus bars within the interior passageway of the cabinet such that the vertical bus bars can substantially traverse the entire interior long axis length of the cabinet;

connecting an adapter to one or more of the vertical bus bars such that the adapter breaches one of the equipment envelopes; and inserting one or more over-current protection devices into the adapter.

17. The method of claim 16, further including securing an electrical component module in the cabinet such that the electrical component module is within the equipment envelope and is electrically connected to the adapter.

\* \* \* \* \*

UNITED STATES PATENT AND TRADEMARK OFFICE
CERTIFICATE OF CORRECTION

PATENT NO. : 8,174,821 B2
APPLICATION NO. : 12/775915
DATED : May 8, 2012
INVENTOR(S) : Fontana et al.

Page 1 of 1

It is certified that error appears in the above-identified patent and that said Letters Patent is hereby corrected as shown below:

On the Title Page, in Item (75), under "Inventors", in Column 1, Line 1, delete "Rockwell," and insert -- Rockwall, --, therefor.

Signed and Sealed this
Ninth Day of September, 2014

Michelle K. Lee
*Deputy Director of the United States Patent and Trademark Office*